3,809,749
TOPICAL PHARMACEUTICAL COMPOSITION AND METHOD EMPLOYING SAP FROM THE TREE CROTON LECHLERI

Georgia J. Persinos, Rockville, Md., assignor to The Amazon Natural Drug Company, Oakton, Va.
No Drawing. Filed Mar. 5, 1971, Ser. No. 121,516
Int. Cl. A61k 7/00, 9/06, 27/14
U.S. Cl. 424—195                              10 Claims

ABSTRACT OF THE DISCLOSURE

A pharmaceutical composition for topical use is provided characterized in that a therapeutically effective amount of the sap obtained from the tree Croton lechleri, M. Arg., (Euphorbiaceae) is incorporated in a pharmaceutically acceptable topical base or carrier. The pharmaceutical composition so produced will be found to be of particular utility in the treatment of minor cuts, abrasions, and like skin wounds by the topical application of the composition thereto.

BACKGROUND OF THE INVENTION

Trees botanically identified as Croton lechleri, M. Arg., family Euphorbiaceae, and which grow in the upper Amazon valley of Peru, have been found to yield a red sap in the form of a viscous exudate. This sap is insoluble in water and has been found to possess a pH 4.4[1], a specific gravity of 1.12[2], a viscosity of 330[3], and a dry matter percent of 29.64[4].

The sap of exudate derived from the trees identified hereinbefore is a source of material from which a compound known as taspine may be isolated or extracted. Taspine is an alkaloid having the empirical formula $C_{20}H_{19}NO_6$ and has been found, particularly when used in the form of an acid salt, to possess a high degree of anti-inflammation activity. The pharmaceutical composition containing the taspine or its salt and the use of such composition orally or by intramuscular injection forms the basis of my application for U.S. Letters Patent filed Oct. 23, 1970, and bearing Ser. No. 83,646, now U. S. Pat. 3,694,557.

SUMMARY OF THE INVENTION

The present invention relates to pharmaceutical compositions for topical application in the treatment of cuts, abrasions, and similar wound to the skin. More specifically, the present invention relates to the incorporation of a therapeutically effective amount of the sap derived from the trees identified as Croton lechleri, M. Arg. family Euphorbiaceae, in an acceptable pharmaceutical base or carrier for topical use in the treatment of minor cuts, abrasions and like wounds to the skin.

The therapeutically effective material of the present invention is obtained by slashing or otherwise cutting the trees identified botanically as Croton lechleri, M. Arg. family Euphorbiaceae, to produce a sap which is in the form of a red, viscous exudate. To prepare the desired pharmaceutical composition, the sap or exudate obtained from the trees is incorporated in a therapeutically effective amount with a suitable pharmaceutically acceptable base or carrier. The pharmaceutical composition so produced may thereafter be topically applied to any minor cut, abrasion or like wound as a healing agent therefor. The pharmaceutical composition so made in accordance with the present invention has been found to materially aid in the prompt healing of skin wounds of the type noted above without fear of any deleterious or harmful side effect therefrom.

While the pharmaceutical compositions of the present invention are primarily for the treatment of minor cuts and abrasions of humans, such materials may be employed in the treatment of wounds on lower animals. The pharmaceutical compositions have been found to be of material aid in the healing of cuts and skin abrasions on dogs, horses, cattle and like animals. Accordingly, the pharmaceutical compositions of the present invention may be characterized as being suitable for use on both humans and animals.

The viscous exudate or sap forming the primary active ingredient of the present invention, as hereinbefore noted, is insoluble in water. However, it has been found that the sap can be rendered miscible with water. Similarly, the sap is also insoluble in almost all conventional solvents, such as, for example, alkaline solutions, alcohol, acetone, hydrocarbon solutions, and the like. To the same extent as with water, it will be found that the sap can be made also miscible with virtually all of such solvents, either inorganic or organic.

The visous exudate or sap of the present invention may be incorporated in a topically acceptable pharmaceutical carrier or base in the form that it exists as collected from the trees. In this form, the sap may be incorporated in a topically useful carrier or base in any conventional or well known manner merely by mixing or blending the exudate until thoroughly blended therewith.

The concentration of the primary active therapeutic ingredient to be employed in the pharmaceutical composition of the present invention may be in any amount which will insure a contact of an effective amount of the active ingredient with the wound and the area surrounding same. In general, the concentration of the active ingredient in the composition will be in the range of 1.0% to 80% by weight, and more particularly in a concentration in the range of 5% to 60% by weight. When the concentration is much above 50%, the pharmaceutical composition should be in the form of a lotion or cream. The particular and preferred concentration from a standpoint of cost, ease of formulation, and wound healing is about 10%. In use, the composition of the present invention may be applied in a manner appropriate to the topical application of pharmaceutical compositions for the type of wound and the locale being treated. Application of the pharmaceutical composition of the present invention may be from one to four times daily, with the frequency being reduced as improvement is noted.

The term "topical" as employed herein relates to the introduction of the medication, incorporated in a suitable base, vehicle, or like carrier, at the site of the cut or wound for exertion of local action. Accordingly, such topical compositions include those pharmaceutical forms in which the medication is applied externally by direct contact with the surface to be treated. Conventional pharmaceutical forms which permit topical applications are ointments, lotions, pastes, creams, jellies, solutions for forming wet dressings, powders, and the like.

The term "pharmaceutical carrier or base" as employed in the present specification and claims is intended to denote any known or suitable pharmaceutical excipients which will produce a composition which permits topical application and which are nontoxic and nonsensitizing and which are compatible with the sap or exudate form- ---
[1] Measured using a Coleman pH meter.
[2] Calculated as the ratio of the weight of a substance in air at 25° C. to that of an equal volume of water at the same temperature.
[3] Measured using a Brookfield synchro-electric viscometer.
[4] Determined by placing 5 ml. of weight sap in a tared beaker and dried at 110° C. for 5 hours. The percent of dry matter was calculated as follows:

$$\frac{\text{Dry wt. of sap}}{\text{Wt. of beaker}} \times 100$$

ing the primary active ingredient of the present invention. The preferred mode of topical application of the composition made in accordance with the present invention is in the form of an ointment which embraces formulations having oleaginous, absorption, water-soluble and emulsion-type bases or carriers. A full and complete disclosure of such ointment bases and the use of such bases, as well as cream and lotion bases and the like, is described in detail in Remington's Practice of Pharmacy, 12th edition (1961), Mack Publishing Company, at pp. 407–424. The many and varied ointment, cream and lotion bases disclosed therein as well as other forms of carriers or bases which are suitable for topical application disclosed therein may be employed in the formulation of the pharmaceutical compositions containing the sap of the present invention as the primary active ingredient therein.

The preferred form of ointment base to be employed in the practice of the present invention is one that is hydrophilic in character and in the form of an oil and water emulsion which is generally designed w/o emulsion base. Such an ointment base is characterized by having water incorporated with a base component capable of absorbing large quantities of water. Such ointment bases are further characterized in that such bases are not dispersible in water and quite-unctuous and oily to the touch. Such pharmaceutical ointment bases can be employed in the present invention as a blended base readily available on the open market, and the sap or exudate in finely divided form may be blended therewith in this form or the ingredients may be blended along with the powdered sap or exudate in a conventional manner. Examples of commercially available hydrophilic ointment bases that may be purchased and used for the incorporation of the sap or exudate therewith are "Cetaphil" marketed by Texas Pharmaceutical Company, "Neobase" marketed by Burroughs Wellcome & Co., Inc., "Unibase" marketed by Parke, Davis & Company, and "Vanibase" marketed by Warren-Teed Company.

While the hydrophilic ointment bases are preferred, it is to be clearly understood that the oil and water emulsion type ointment bases designated as o/w emulsion bases can be employed equally as well in the present invention. Such o/w ointment emulsion bases are characterized by their washability with water and are easy to apply and impart a pleasant feeling to the skin. Such o/w emulsion bases usually consist of an oil or wax or a blended oil phase, a surfactant or combination of surfactants, and water.

Topical compositions made in accordance with the present invention and as herein defined are also intended to include those pharmaceutical forms which afford local as opposed to systemic release onto the immediate affected area where such areas are not readily acceptable for direct external application. A particular form of such use is by way of aerosol application. For a full disclosure of suitable aerosol propellants and other ingredients that may be used in this type of formulation in the practice of the present invention as well as mode of formulation, reference is to be had to pp. 512–528 of Remington's Practice of Pharmacy, 12th edition (1961), Mack Publishing Company.

Various other active ingredients may be included, if desired, in the formulation of the present invention to provide other and supplementary effects thereto which, when employed in the treatment of particular conditions, enhance the usefulness of the said primary active ingredients. Thus, various antibiotics such as neomycin, the tetracyclines, novobiocin, erythromycin, bacitracin, polymyxin, and penicillin, alone or in combination; antifungal agents such as iodochlorohydroxyquin, filipin and nystatin, and local anesthetic agents such as procaine hydrochloride, ethylaminobenzoate, phenocaine hydrochloride, tetracaine hydrochloride, lidocaine hydrochloride, primoxine hydrochloride, and the like can be included in the formulation. In addition, other and well known conventional inert and excipient materials which have been employed in or added to the pharmaceutical composition for various purposes may be employed, if desired, in the pharmaceutical composition of the present invention.

DESCRIPTION OF SPECIFIC AND ILLUSTRATIVE EMBODIMENTS

In order to further illustrate the present invention, the following examples of compositions made in accordance with the present invention are given, but such compositions are not to be construed as limiting the scope thereof. The sap or exudate obtained from the tree *Croton lechleri*, M. Arg. (Euphorbiaceae) which forms the primary active ingredient of the present invention is used in the form of a viscous exudate and is employed in the following examples in this form. In the following examples, the primary active ingredient so prepared will be designated as "viscous exudate" in each example.

EXAMPLE I

Hydrophilic w/o ointment

| | Percent |
|---|---|
| Neobase [1] | 90 |
| Viscous exudate | 10 |

[1] A hydrophilic emulsion water/oil ointment base composition marketed by Burroughs Wellcome Co., Inc.

The Neobase ointment base and the viscous exudate are added and mixed thoroughly in a high speed mixer at room temperature. The whole is then passed through a mill and mixed in a high speed mixer until the product is homogeneous. The resulting pharmaceutical composition is applied to the cut and the surrounding area thereof twice daily.

EXAMPLE II

Hydrophilic, w./o. ointment

| | Percent |
|---|---|
| Neobase [1] | 50 |
| Viscous exudate | 50 |

[1] A hydrophilic emulsion water/oil ointment base composition marketed by Burroughs Wellcome Co., Inc.

The pharmaceutical composition is formulated in the same manner as set forth in Example I. The above pharmaceutical composition so formed is applied to the cut and the surrounding area once a day.

EXAMPLE III

Hydrophilic, w./o. ointment

| | Percent |
|---|---|
| Neobase [1] | 70 |
| Viscous exudate | 30 |

[1] A hydrophilic emulsion water/oil ointment base composition marketed by Burroughs Wellcome Co., Inc.

The pharmaceutical composition of this example is formulated in the same manner as set forth in Example I. The pharmaceutical composition so formed is applied to the wound area twice a day.

EXAMPLE IV

Hydrophilic, w./o. ointment

| | Percent |
|---|---|
| Unibase [1] | 80 |
| Viscous exudate | 20 |

[1] A hydrophilic water/oil emulsion ointment base composition marketed by Parke, Davis & Company.

The Unibase ointment base is heated to a temperature of about 135° F. (57° C.) and the viscous exudate is added thereto and mixed in thoroughly with a high speed mixer. The whole is then passed through a mill and mixed in a high speed mixer until the product is congealed and homogeneous. The pharmaceutical composition is applied to the wound area twice daily.

EXAMPLE V

Oil/water ointment

| | Percent |
|---|---|
| Mineral oil | 30 |
| Beeswax | 14 |
| Lanolin | 8 |
| Sorbitan monostearate | 2.0 |
| Polyoxyethylene sorbitan monostearate | 3.0 |
| Viscous exudate | 10 |
| Water | 33 |

The mineral oil, beeswax, lanolin and the stearates were heated to 70° C. and the viscous exudate added thereto and mixed in thoroughly with a high speed mixer. The water was heated to 72° C. and added slowly to the material while the mixer was in operation. The mixing in the high speed mixer was continued until the composition has cooled and the product is congealed. The pharmaceutical composition is appled to the wound area three times daily.

EXAMPLE VI

Ointment 5 kilograms of an ointment containing 10% of the viscous exudate of the present invention is prepared from the following materials, the percentages given being by weight:

| | Gm. |
|---|---|
| 4% ceresinum wax | 200 |
| 20% white mineral oil | 1,000 |
| 0.5% cholesterol, U.S.P. | 25 |
| 0.2% methylparaben, U.S.P. | 1 |
| 0.18% N-butyl-p-hydroxybenzoate | 9 |
| 10% viscous exudate | 500 |
| White petrolatum q.s. | 1,000 |

The petrolatum and ceresinum wax are melted together and the mineral oil added. The mixture is heated to 190° F. and the cholesterol added. After cooling to 170° F., the paraben and hydroxybenzoate are introduced. The resulting mixture is strained and cooled to between 130 and 135° F. The viscous exudate is added and mixed in thoroughly with a high speed mixer. The whole is then passed through a mill and mixed in a high speed mixer until the product is congealed. The product is then ready for potency assay and packing. The foregoing pharmaceutical ointment can be employed in the treatment of minor cuts or skin abrasions by rubbing the ointment on the injured area twice daily.

EXAMPLE VII

Cream

A cream containing 60% of viscous exudate is prepared in a 1,000 gram lot from the following ingredients, the percentage given being by weight:

| | Gm. |
|---|---|
| 15% self-emulsifying glyceryl monostearate | 150 |
| 10% spermaceti, U.S.P. | 100 |
| 5% propylene glycol, U.S.P. | 50 |
| 0.5% sorbitan mono-oleate polyoxyethylene, U.S.P. | 5 |
| 0.1% methylparaben, U.S.P. | 1 |
| 60% viscous exudate | 600 |
| Deionized water q.s. | 1,000 |

The glyceryl monostearate and spermaceti are melted together at a temperature of about 80° C. The methylparaben is dissolved in about 500 grams of water and the propylene glycol and the polyoxyethylene and the viscous exudate are added in turn, maintaining a temperature at 75 to 80° C. The methylparaben mixture is added slowly to the monostearate and spermaceti melt with a constant stirring. The addition is continued for at least 30 minutes with additional stirring until the temperature has dropped to about 40° C. Finally, sufficient water is added to bring the final weight to 1,000 grams and the preparation is stirred until homogeneous.

EXAMPLE VIII

Lotion 10 liters of a viscous lotion containing 60% of the viscous exudate is prepared from the following materials:

| Mq. | | Gm. |
|---|---|---|
| 50 | Propylene glycol, U.S.P. | 500 |
| 2 | Methylparaben, U.S.P. | 20 |
| 3 | N-butyl-p-hydroxybenzoate | 30 |
| 20 | Sorbitan mono-oleate polyoxyethylene, U.S.P. | 200 |
| 80 | Glyceryl mono-stearate-diethylaminoethyl oleylamide phosphate (19:1). | 800 |
| 35 | Spermaceti, U.S.P. | 350 |
| 600 | Viscous exudate | 6,000 |
| | Deionized water, q.s. 10 liters. | |

The methylparaben and n-butyl-p-hydroxybenzoate are dissolved in 4.5 liters of deionized water and the solution heated to 70 to 80° C. To this solution are added the propylene glycol, the polyoxyethylene, glyceryl monostearate-diethylaminoethyl oleylamide phosphate and spermaceti. The temperature of the mixture is maintained at 70 to 80° C. for 30 minutes and then allowed to cool to 35 to 45° C. The various exudate is then introduced with vigorous mixing, water added to make 10 liters, and the resulting product put through a homogenizer. This product is then ready for assay and packaging for clinical use. The above pharmaceutical lotion is applied twice daily to the wound area.

EXAMPLE IX

Aerosol

An aerosol containing approximately 2.5% of the viscous exudate is prepared from the following ingredients:

| | Gm. |
|---|---|
| Absolute alcohol | 4.37 |
| Dichlorodifluorotetrafluoroethane | 1.43 |
| Dichlorotetrafluoroethane | 5.70 |
| Viscous exudate | 300 |

The viscous exudate is suspended in the absolute alcohol by agitation of the mixture and the suspension is chilled to about minus 30° C. To this is added the chilled mixture of dichlorodifluoromethane and dichlorotetrafluoroethane. Thirteen ml. plastic-coated amber bottles are cold filled with 11.5 gm. each of the resulting solution and capped with a metering valve. The resulting package, when inverted into an oral inhalation adapter and the valve opened, will deliver a metered dose containing 2 mg. of di-glyceraldehyde and 0.3 mg. of phenylephrine hydrochloride. The product is then ready for assay and clinical use. The aerosol is administered three times daily in treating the wound area.

Test Data

To evaluate the healing characteristic of pharmaceutical compositions made in accordance with the present invention, reference is to be had to the following wound healing assay test:

Young, adult, male Wistar rats of 175 gm. body weight were caged separately and allowed food and water (Rockland Mouse and Rat Diet) ad libitum. Groups of ten animals were used for each of the tests. The ointment composition used in the tests is a standard consisting of Neobase [5] and the test intment is the composition of Example I consisting of Neobase [1] and 10% of the viscous exudate.

Each rat was lightly anesthetized with ether. The skin of the shoulder and back regions where the wound was to be made was shaven. The circular 25 mm. wound was outlined in ink and then excised with surgical scissors and forceps. The day of wounding was day 0. Each day, up to day 4, a thin application of each of the ointment compositions was made on the wound.

---
[5] A commercial hydrophilic ointment base marketed by Burroughs Wellcome Co., Inc.

On day 1, longitudinal, transverse, and two diagonal measurements, relative to the vertebral column, were made of the diameter of the wound to the nearest 0.1 mm. using direct-reading calipers. Subsequent wound measurements were made on day 4 at which time the scab was easily removed without visible trauma leaving the healed/unhealed tissue margin clearly visible.

The area of each wound was calculated by multiplying its mean diameter by 3.1416/4. Percent wound closure was calculated relative to day 1.

The composition of Example I accelerated the wound healing in comparison with the standard as evidenced by the following data appearing in Table I:

TABLE I

| Composition: | Percent wound closure day 4 |
|---|---|
| Neobase Standard | 17.1 |
| Example I | 24.9 |

Toxicity tests

To establish that pharmaceutical compositions made in accordance with the present invention are quite safe to use in all concentrations, various compositions have been made and tested on rats, cats, and guinea pigs. These tests were reported as follows:

A. Oral dose range and acute toxicity tests on rats.—Three suspensions were made as follows:

1. A 50% water suspension is made so that one ml. contains approximately 0.5 gms. of a 10% concentration of viscous exudate.
2. A 50% water suspension is made so that one ml. contains approximately 0.5 gms. of a 50% concentration of viscous exudate.
3. A 50% water suspension is made so that one ml. contains approximately 0.5 gms. of a 100% concentration of viscous exudate.

The tests were made on the following assumptions:
(a) The weight of the average human is considered to be 50 kilograms.
(b) The average human would use the proposed 10% ointment twice a day.
(c) Each time a person would use approximately one gram of ointment per application.

Based on the above assumptions, a rat receiving two grams/kilogram of body weight by gastric tube of the 10% ointment would be receiving 50 times the human dose; a rat receiving two grams/kilogram of the 50% dose, would be receiving 250 times the human dose in the terms of the 10% sap ointment, while a rat receiving two grams/kilogram of the pure sap would be receiving 500 times the human dose, again in terms of the 10% sap ointment.

The following dose-range finding study was conducted on the rats and the results are shown in Table II below:

TABLE II.—ORAL DOSE RANGE FINDING STUDY

| | | Suspension given by gastric tube | | | |
|---|---|---|---|---|---|
| Rat number and sex | Body weight (grams) | Type | Quantity, ml. | Gram/ kilogram | Results (1 week later) |
| 1 M | 490 | 10% | 2 | 2 | Alive and well. |
| 2 F | 380 | 10% | 2 | 2+ | Do. |
| 3 M | 520 | 50% | 2 | 10 | Do. |
| 4 F | 445 | 50% | 2 | 10 | Do. |
| 5 M | 477 | Pure sap | 2 | 20 | Do. |
| 6 F | 413 | do | 2 | 20+ | Do. |

All animals were closely observed during the first 48 hours of the administration of the compounds and no abnormal signs were observed. The animals were alive and well a week later at which time all of them were autopsied with no gross pathological findings of any kind found in any one animal.

Based on the results obtained from the above dose-range finding study, an acute toxicity protocol was designed and executed as summarized in Table III given hereinafter. The same suspensions were used as in the dose-range finding study. Ten rats were used, five males and five females per suspension. The experiment was started after the animals were conditioned in the laboratory. Food and water were offered to all the rats ad libitum.

These rats were carefully and closely observed during the first 48 hours after administration of the suspension and daily thereafter for a period of one week. No abnormal signs were observed. All animals were alive and well a week later.

All animals were autopsied and all internal organs, particularly the gastrointestinal tract, were carefully inspected. No abnormal findings were seen. This was particularly true of animal designated 30 F., the only one which lost weight during the study.

TABLE III.—ORAL ACUTE TOXICITY DATA

| | Body weights (grams) | | | Suspension given by gastric tube | | | |
|---|---|---|---|---|---|---|---|
| Rat number and sex | Initial | Terminal | Net | Type | Quantity, ml. | Gm./ kg. | Results (1 week later) |
| 11 M | 225 | 266 | 41 | 10% | 1 | 2 | Alive and well. |
| 13 M | 230 | 260 | 30 | 10% | 1 | 2 | Do. |
| 15 M | 230 | 290 | 60 | 10% | 1 | 2 | Do. |
| 17 M | 235 | 300 | 65 | 10% | 1 | 2 | Do. |
| 19 M | 235 | 288 | 53 | 10% | 1 | 2 | Do. |
| 12 F | 175 | 187 | 12 | 10% | 1 | 2+ | Do. |
| 14 F | 150 | 170 | 20 | 10% | 1 | 2+ | Do. |
| 16 F | 175 | 201 | 26 | 10% | 1 | 2+ | Do. |
| 18 F | 160 | 179 | 19 | 10% | 1 | 2+ | Do. |
| 20 F | 175 | 192 | 17 | 10% | 1 | 2+ | Do. |
| 21 M | 235 | 244 | 9 | 50% | 1 | 10 | Do. |
| 23 M | 245 | 250 | 5 | 50% | 1 | 10 | Do. |
| 25 M | 200 | 243 | 43 | 50% | 1 | 10+ | Do. |
| 27 M | 220 | 274 | 54 | 50% | 1 | 10 | Do. |
| 29 M | 220 | 279 | 59 | 50% | 1 | 10 | Do. |
| 22 F | 175 | 200 | 25 | 50% | 1 | 10+ | Do. |
| 24 F | 160 | 190 | 30 | 50% | 1 | 10+ | Do. |
| 26 F | 175 | 204 | 29 | 50% | 1 | 10+ | Do. |
| 28 F | 160 | 195 | 35 | 50% | 1 | 10+ | Do. |
| 30 F | 170 | 158 | −12 | 50% | 1 | 10+ | Do. |
| 31 M | 240 | 272 | 32 | Pure sap | 1 | 20 | Do. |
| 33 M | 235 | 290 | 55 | do | 1 | 20 | Do. |
| 35 M | 225 | 277 | 52 | do | 1 | 20 | Do. |
| 37 M | 200 | 255 | 55 | do | 1 | 20+ | Do. |
| 39 M | 200 | 232 | 32 | do | 1 | 20+ | Do. |
| 32 F | 175 | 190 | 15 | do | 1 | 20+ | Do. |
| 34 F | 160 | 177 | 17 | do | 1 | 20+ | Do. |
| 36 F | 160 | 180 | 20 | do | 1 | 20+ | Do. |
| 38 F | 160 | 161 | 1 | do | 1 | 20+ | Do. |
| 40 F | 180 | 208 | 28 | do | 1 | 20+ | Do. |

Based on the results of these studies as reported in Tables II and III, it is concluded that rats can tolerate orally without any adverse effects a dose which is 500 times higher than the approximate daily amount to be used cutaneously by the average human adult.

B. Oral acute toxicity tests on cats.—The following four suspensions in water were made:

1. Suspension #4: Base Ointment (Neobase[6]). A 50% suspension was made in water so that one ml. contained approximately 0.5 gram of "Base Ointment."
2. Suspension #5: Sap Ointment 10%. A 50% suspension was made so that one ml. contained approximately 0.5 gram of "Sap Ointment 10%."
3. Suspension #6: Sap Ointment 50%. A 50% suspension was made so that one ml. contained approximately 0.5 gram of "Sap Ointment 50%."
4. Suspension #7: Pure Sap, 100 Concentration. A 50% suspension was made so that one ml. contained approximately 0.5 gram of "Pure Sap."

This study was conducted on the basis of the following assumptions:

(a) The weight of the average human is considered to be 50 kilograms.
(b) The average human would use the proposed "Sap Ointment 10%" twice a day.
(c) Each time a person would use approximately one gram of ointment per application.

Based on the above assumptions, a kitten receiving two grams/kilogram of body weight by gastric tube of the 10% ointment would be receiving 50 times the human dose; a kitten receiving two grams/kilogram of the 50% ointment would be receiving 250 times the human dose in terms of the 10% ointment, while a kitten receiving two grams/kilogram of the pure sap would be receiving 500 times the human dose, again in terms of the 10% ointment.

Eight registered healthy kittens, weighing 550–1330 grams, were received from Animal Resources, Woodsboro, Maryland. These were treated as shown in Table IV hereinafter. The various suspensions were administered by gastric tube, using a Robinson French catheter #12. Water was available ad libitum. The kittens were fed twice a day with cat food and milk.

The animals were carefully and closely observed during the first 48 hours after administration of the various suspensions and daily thereafter for a period of one week. No abnormal signs were observed. All animals were alive and well a week later. All animals were autopsied and all internal organs, particularly the gastro-intestinal tract, were carefully inspected. No abnormal findings were seen. This was particularly true of animals 7526 and 7380, the only two of which lost weight during the study period.

C. Subacute skin toxicity and hypersensitivity tests on guinea pigs.—Tests were conducted on guinea pigs using the ointment base Neobase[7] as the control and a composition in accordance with Example 1 wherein the Neobase ointment base contained 10% of the viscous exudate. The guinea pigs used in the tests were Albino inbred guinea pigs obtained from commercial breeders. All of the animals were quarantined for two weeks prior to the tests and were found to be free of disease and healthy in appearance.

The individual daily food intake was monitored for all guinea pigs during their seond quarantine week (0 week) and daily thereafter for the remaining weeks of the experiment. The control composition and the pharmaceutical composition used in the tests were administered locally between the animals' shoulder blades, using guinea pigs with non-abraded skin as well as guinea pigs with abraded skin. The compound in each instance was freely applied to the shaved and/or the abraded backs of the animals with a wood spatula. Each group contained six male and six female guinea pigs as follows:

1. Group I: Control #1; abraded skin, covered.
2. Group II: Control #2; ointment base alone; abraded skin, exposed.
3. Group III: Control #3; ointment base alone; abraded skin, covered.
4. Group IV: Experimental #1; ointment containing 10% sap; non-abraded skin.
5. Group V: Experimental #2; ointment containing 10% sap; abraded skin, uncovered.
6. Group VI: Experimental #3; ointment containing 10% sap; abraded skin, covered.

At twenty-one days three males and three females were sacrificed for gross pathological examination of major organs. The remaining animals were subsequently put on a regular diet. Two weeks later all animals were challenged with a composition of Example 1, to wit, a 10% ointment, and the animals carefully observed for any signs of hypersensitivity for 24 hours. All surviving animals were sacrificed thereafter for gross pathological examination of all major organs.

The results of the tests and subsequent pathological examination clearly established that all animals gained weight throughout the duration of the tests, that there were no hematological or biochemical changes found during the tests, and no gross pathology was observed at autopsy. These tests conducted on seventy-two animals simulating various human conditions under which the compound may be used, shows that a composition made up of an ointment base containing a 10% concentration of the viscous exudate of the present invention is both harmless as well as nonantigenic to guinea pigs when applied to the animals cutaneously daily.

[7] A hydrophilic emulsion water/oil ointment base composition marketed by Burroughs Wellcome Co., Inc.

TABLE IV.—ORAL ACUTE TOXICITY DATA WITH KITTENS

| Kitten number and sex | Body weight (grams) | | | Suspension given by gastric tube | | | Results (1 week later) |
|---|---|---|---|---|---|---|---|
| | Initial | Terminal | Net | Type | Quantity, ml. | Gm./kg. | |
| 7525 M | 1,330 | 1,288 | 42 | Base | 5.3 | 0 | Alive and well. |
| 7383 F | 1,175 | 1,403 | 228 | do | 4.7 | 0 | Do. |
| 7379 M | 550 | 585 | 35 | 10% oint | 2.2 | 2 | Do. |
| 7377 F | 750 | 844 | 94 | do | 3 | 2 | Do. |
| 7526 M | 1,200 | 1,148 | −52 | 50% oint | 4.8 | 10 | Do. |
| 7515 F | 875 | 1,033 | 158 | do | 3.5 | 10 | Do. |
| 7380 M | 675 | 670 | −5 | Pure sap | 2.7 | 20 | Do. |
| 7378 F | 835 | 1,054 | 219 | do | 3.2 | 20 | Do. |

Based on the results of these studies, it is concluded that kittens can tolerate orally without any adverse effects a dose which is 500 times higher than the approximate daily amount to be used cutaneously by the average human adult.

[6] A hydrophilic emulsion water/oil ointment base composition marketed by Burroughs Wellcome Co., Inc.

I claim:

1. A pharmaceutical composition for topical application comprising a therapeutically effective wound treating amount of a sap obtained from the tree *Croton lechleri*, M. Arg. (Euphorbiaceae) and a pharmaceutically acceptable topical carrier.

2. A pharmaceutical composition in accordance with claim 1, wherein the topical carrier is an ointment base.

3. A pharmaceutical composition in accordance with claim 1, wherein the topical carrier is a hydrophilic base.

4. A pharmaceutical composition in accordance with claim 1, wherein the topical carrier is a cream base.

5. A pharmaceutical composition in accordance with claim 1, wherein the topical carrier is a lotion base.

6. A pharmaceutical composition in accordance with claim 1, wherein said sap and said carrier are combined with an aerosol propellant.

7. A pharmaceutical composition in accordance with claim 1, wherein the sap is present in a concentration of 1.0% to 80% by weight.

8. A pharmaceutical composition in accordance with claim 1, wherein the sap is present in a concentration of 5 to 60%.

9. A pharmaceutical composition in accordance with claim 1, wherein the sap is present in a concentration of about 10% and the carrier is an ointment base.

10. The method of treating minor cuts and abrasions comprising topically applying the composition of claim 1 to the site of the cut or abrasion.

References Cited

Hocking, "A Dictionary of Terms in Pharmacognosy," p. 63, Charles C. Thomas, Publisher, Illinois, 1955.

Steinmetz, Codex Vegetabilis, items, 359–61, Amsterdam, 1957.

ALBERT T. MEYERS, Primary Examiner

D. B. MOYER, Assistant Examiner

U.S. Cl. X.R.

424—45